United States Patent Office 3,006,811
Patented Oct. 31, 1961

3,006,811
METHOD FOR IMPROVING THE ECONOMIC VALUE OF POULTRY
Byron M. Shinn, Western Springs, Emil Kaiser, Chicago, and John F. Roland, Jr., Glenview, Ill., assignors, by mesne assignments, to Armour & Company, Chicago, Ill., a corporation of Delaware
No Drawing. Filed July 11, 1958, Ser. No. 747,819
5 Claims. (Cl. 167—53.1)

The present invention relates to a method for improving the economic value of poultry which are raised principally for the edibility of their flesh.

One factor of importance in the grading of poultry carcasses is the so called "finish" of the birds. The better the finish the greater will be the saleability and economic value of the carcass, with all other factors being equal. A number of criteria affect the determination of finish. These include the skin texture, the amount of fat and the distribution of the fat on the carcass.

There has been considerable interest in the use of esterogenic compounds for the improvement of finish. In many instances such compounds supplied to poultry either orally or parenterally have substantially improved the finish of the carcass, or at least has substantially increased the deposition of fat. It has been believed that this effect has been due to the estrogenic activity of the compounds. It has been noted that the supplying of such compounds to cockerels, particularly, when large dosages were employed, was accompanied by a suppression of the maleness of the birds. One such astrogenic compound that has been used extensively used is diethylstilbestrol.

When the estrogenic compounds are supplied to the birds parenterally care must be taken to see that none of it remains in the carcass after it is slaughtered for food. The usual practice has been to implant it in the necks of the birds so that the necks, with the implant therein, may be cut off and disposed of at the time of the slaughtering and dressing of the poultry. These necks, however, cannot be sold for food. In at least one instance a poultry processor was subjected to a claim for damages when the necks were sold to a mink breeder who fed the necks to his minks with the claimed result that the male minks became sterile as a result of ingesting the estrogen remaining in the necks.

While the adding of the estrogens to the animal feed decreases the likelihood that there will be any residual estrogenic material deposited in the carcasses after slaughtering, there is some evidence that the carcasses may not be entirely free from the estrogenic material that the animals were fed. Tests have indicated that residual estrogenic material, if any, is present in very minute quantities when the estrogenic compounds have been fed according to approved practice. But, there are those persons who believe that even these minute quantities would exert harmful effects on people who consumed meat from animals fed estrogenic material, over an extended period of time. There also is a real hazard to persons concerned in the process of handling estrogenic material in the preparation of feed premixes and in the process of introducing the material into the feeds, etc. To the extent that these problems do exist they will be substantially eliminated by the process of the present invention.

We have discovered that, surprisingly enough, some of the derivatives of some of these estrogenic materials when supplied to poultry during at least a portion of the growth period thereof will improve the finish to an extent comparable to, or to a greater extent than, that obtained through the use of the estrogens even though these derivatives exhibit only a negligible fraction of the estrogenic effects of the parent estrogenic material. Thus the principal object of the present invention is to provide a process for improving the finish of poultry which process does not involve the disadvantages that accompany some of the prior art practices. Broadly our process comprises supplying, orally or parenterally, immature poultry during at least a portion of the growth period thereof with estrogen derivatives; namely, substances comprising 4,4'-oxygenated stilbene derivatives and 4,4'-oxygenated diphenylhexane derivatives, said derivatives having at least two substituents in the aromatic nuclei, said substituents being made up of aliphatic straight chains containing at least two carbon atoms, aliphatic branched chains, aromatic rings, and cyclic and heterocyclic rings. These materials have the following general chemical structure:

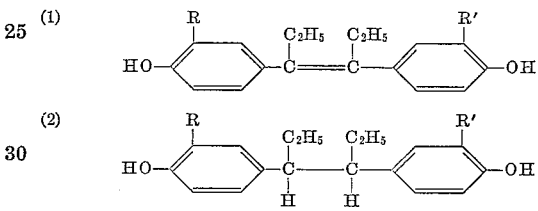

Broadly, R and R' are alkyl, aryl or cyclic compounds. More specifically, R and R' could be an allyl, propenyl, propyl, cyclopentenyl, chloroallyl, bromoallyl, methallyl, hexyl, octyl, benzyl, phenyl, toluyl or cyclopentyl group. Specific examples of materials in this general class are 3,3'-diallyldiethylstilbestrol; 3,3'-diallylhexestrol; 3,3'-dipropyldiethylstilbestrol; 3,3'-dipropenylhexestrol; 3,3'-dipropylhexestrol; 3,3'-diallyl, 4,4'-dihydroxydiphenylhexane; 3,3'-dipropyl, 4,4'-dihydroxydiphenylhexane; and 3,3'-dipropenyl, 4,4'-dihydroxydiphenylhexane. The production of such materials is disclosed in United States Patent No. 2,502,324 and Patent No. 2,502,325.

The insignificant estrogenic effect of 3,3'-diallylhexestrol and 3,3'-diallyldiethylstilbestrol as compared to diethylstilbestrol was demonstrated by following the test outlined in detail in "Detection of Estrogenic Substances in Alfalfa and Clover Hays Fed to Fattening Lambs," by Cheng et al., Journal of Animal Science, January 1953. In these tests the effect of the materials in stimulating the increase in uterine weight of immature female mice was measured and it was found that the 3,3'-diallyldiethylstilbestrol and the 3,3'-diallylhexestrol had from 0.04% to 0.08% of the estrogenic activity of diethylstilbestrol. The substantial lack of estrogenic effect of the stilbene derivatives is also demonstrated by the information set forth in the publication "Preparation of New Derivatives of Diethylstilbestrol and Hexestrol by the Claisen Rearrangement," Kaiser et al., Journal of the American Chemical Society, vol. 68, p. 636 et seq.

*Example I*

This example demonstrates the desirable weight promoting effect, including an increase in abdominal fat, of 3,3'-diallylhexestrol as compared with hexestrol without an attendant down grading. Each group comprised a battery of 15 male New Hampshire X Barred Rock chicks. For a period of eight weeks each group was fed a basal ration having the following composition:

|  | Percent |
|---|---|
| Ground yellow corn | 63.00 |
| Dehy. alfalfa meal | 2.50 |
| Soybean oil meal | 23.50 |
| Meat and bone scrap (50%) | 4.00 |
| Dried skim milk | 2.00 |
| Pulv. limestone (90-95%) | 1.00 |
| Steamed bone meal | 1.50 |
| Iodized salt | 0.45 |
| Manganese sulfate (85%) | 0.05 |
| Vitamin mix | 1.00 |
| Stabilized tallow | 1.00 |

In addition group 2 received 60 mg. hexestrol per pound of feed and group 3 received 60 mg. 3,3'-diallylhexestrol per pound of feed. The results were as follows:

| Group | Av. Final Wt., gm. | Percent Increase | Feed Eff. | Abdominal Fat, gm. | Grade, Percent | | |
|---|---|---|---|---|---|---|---|
| | | | | | A | B | C |
| 1 | 1,522 | | 2.29 | 27 | 57 | 36 | 7 |
| 2 | 1,716 | 12.8 | 2.56 | 91 | 57 | 14 | 29 |
| 3 | 1,665 | 9.39 | 2.36 | 37 | 58 | 42 | 0 |

Feed efficiency is defined as the grams of feed consumed to produce a weight gain of one gram.

*Example II*

This example demonstrates the advantage in weight gain that can be obtained merely be feeding the stilbene derivatives for a short time towards the end of the chick growth period. In this example each group comprised twenty male New Hampshire Barred Rock chicks. Each group was fed for eight weeks on the basal ration of Example I. For the last three of the eight weeks 3,3'-diallylhexestrol was added to the feed of groups 2 and 3, group 2 receiving 15 mg. per pound of feed ang group 3 receiving 30 mg. per pound of feed. The results were as follows:

| Group | Av. Final Wt., gm. (20) | Av. Final Wt. (12 heaviest), gm. |
|---|---|---|
| 1 | 1,622 | 1,790 |
| 2 | 1,655 | 1,834 |
| 3 | 1,657 | 1,837 |

*Example III*

In this example all groups were fed a basal diet recommended for test purposes by the Animal Nutrition Research Council. This diet is set forth in detail on page 6 of the publication "Feedstuffs" for April 28, 1956. In addition group 2 received 15 mg. hexestrol per pound of feed. Groups 3 and 4 received 15 mg. and 45 mg., respectively, of 3,3'-diallylhexestrol per pound of feed. Each group consisted of 19 male New Hampshire X Barred Rock chicks and the duration of the test was eight weeks.

The greater the deposition of abdominal fat in relation to the total size of the bird the more desirable is the bird from a sales standpoint. The effect of the 3,3'-diallylhexestrol in this regard is shown by the following results:

| Group | Av. Final wt., gms. | Av. Abdominal fat, gms. |
|---|---|---|
| 1 | 1,729 | 10.7 |
| 2 | 1,714 | 15.6 |
| 3 | 1,701 | 16.2 |
| 4 | 1,720 | 18.4 |

The foregoing detailed description is only for clearness of understanding and for the purpose of complying with 35 U.S.C. 112 and we do not desire to be limited to the exact details for obvious modifications will occur to a person skilled in the art.

We claim:
1. The method of improving the finish of poultry including the step of introducing into immature poultry during at least a portion of the growth period thereof an effective amount of a substance selected from the group consisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains, and aromatic rings.

2. The method of improving the finish of poultry including the step of implanting in immature poultry prior to the end of the growth period thereof an effective amount of a substance selected from the group consisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains, and aromatic rings.

3. The method of improving the finish of poultry including the step of feeding immature poultry an effective amount of a substance selected from the group consisting of 4,4'-oxygenated 3,3'-substituted diethylstilbestrol derivatives and 4,4'-oxygenated 3,3'-substituted hexestrol derivatives, the substituents in said 3,3' positions being selected from the class consisting of aliphatic straight chains containing at least two carbon atoms, aliphatic branched chains, and aromatic rings.

4. The method of improving the finish of poultry including the step of introducing into immature poultry during at least a portion of the growth period thereof an effective amount of a substance comprising 3,3'-diallyldiethylstilbestrol.

5. The method of improving the finish of poultry including the step of introducing into immature poultry during at least a portion of the growth period thereof an effective amount of a substance comprising 3,3'-diallylhexestrol.

References Cited in the file of this patent

UNITED STATES PATENTS 2,541,447    Turner et al.     Feb. 13, 1951

OTHER REFERENCES

Kaiser et al.: Jr. Am. Chem. Soc. 168 (1946), pp. 636-8.